(12) United States Patent
Grip

(10) Patent No.: US 12,071,064 B2
(45) Date of Patent: Aug. 27, 2024

(54) APPARATUSES FOR SECURING CONTAINERS

(71) Applicant: THE BOEING COMPANY, Chicago, IL (US)

(72) Inventor: Robert Erik Grip, Rancho Palos Verdes, CA (US)

(73) Assignee: THE BOEING COMPANY, Arlington, VA (US)

( * ) Notice: Subject to any disclaimer, the term of this patent is extended or adjusted under 35 U.S.C. 154(b) by 806 days.

(21) Appl. No.: 16/720,423

(22) Filed: Dec. 19, 2019

(65) Prior Publication Data
US 2021/0188537 A1 Jun. 24, 2021

(51) Int. Cl.
| | |
|---|---|
| B60P 7/13 | (2006.01) |
| B60P 7/08 | (2006.01) |
| B60P 7/10 | (2006.01) |
| B65D 90/00 | (2006.01) |

(52) U.S. Cl.
CPC .............. B60P 7/13 (2013.01); B60P 7/083 (2013.01); B60P 7/10 (2013.01); B65D 90/0006 (2013.01)

(58) Field of Classification Search
CPC .... B60P 7/10; B60P 7/13; B60P 7/083; B60P 7/132; B60P 7/18; B65D 90/0006
USPC ... 410/32, 34, 68, 78–79, 81–82, 85, 96–97, 410/100
See application file for complete search history.

(56) References Cited

U.S. PATENT DOCUMENTS

| | | | |
|---|---|---|---|
| 3,563,403 A | 2/1971 | Luisada et al. | |
| 3,598,273 A | 8/1971 | Rau et al. | |
| 3,601,866 A * | 8/1971 | Odin | B65D 90/0033 410/91 |
| 3,706,392 A | 12/1972 | Sprick et al. | |
| 3,711,902 A | 1/1973 | Eggert, Jr. | |

(Continued)

FOREIGN PATENT DOCUMENTS

| | | |
|---|---|---|
| AT | 510497 A1 | 4/2012 |
| CN | 1671933 A | 9/2005 |

(Continued)

OTHER PUBLICATIONS

European Patent Office Extended European Search Report for Application No. 20211436.9-1016 dated May 11, 2021.

(Continued)

*Primary Examiner* — Stephen T Gordon
(74) *Attorney, Agent, or Firm* — Patterson + Sheridan, LLP

(57) ABSTRACT

Certain aspects of the present disclosure provide a method of securing containers, comprising: connecting a first strap end connector of a tension strap to a first strap connector fitting on a first container, wherein: the first strap end connector comprises a first hook portion configured to engage a first recess in the first strap connector fitting, and the first strap end connector comprises a first protrusion configured to engage a second recess in the first strap connector fitting; connecting a second strap end connector of the tension strap to a second strap connector fitting on a second container, wherein: the second strap end connector comprises a first hook portion configured to engage a first recess in the second strap connector fitting, and the first strap end connector comprises a first protrusion configured to engage a second recess in the second strap connector fitting; and tensioning the tension strap.

11 Claims, 13 Drawing Sheets

(56) References Cited

U.S. PATENT DOCUMENTS

| | | | |
|---|---|---|---|
| 3,966,075 A | | 6/1976 | Schultz |
| 4,249,840 A | * | 2/1981 | Kallaes ................ B60P 7/13 |
| | | | 410/84 |
| 4,695,184 A | | 9/1987 | Robishaw et al. |
| 4,759,668 A | | 7/1988 | Larsen et al. |
| 4,768,905 A | * | 9/1988 | Reynard ........... B65D 90/0006 |
| | | | 410/78 |
| 5,026,230 A | * | 6/1991 | Dolezych ............. B60P 7/0861 |
| | | | 410/96 |
| 6,010,021 A | | 1/2000 | Zuidam et al. |
| 6,299,008 B1 | | 10/2001 | Payne |
| 10,308,424 B2 | | 6/2019 | Vancampen |
| 10,947,036 B2 | | 3/2021 | Helou, Jr. |
| 2003/0215300 A1 | * | 11/2003 | Hsieh ................ B63B 25/004 |
| | | | 410/96 |
| 2007/0000921 A1 | | 1/2007 | Butler et al. |
| 2017/0283114 A1 | | 10/2017 | Marschall |
| 2018/0194548 A1 | | 7/2018 | Helou, Jr. |

FOREIGN PATENT DOCUMENTS

| | | |
|---|---|---|
| CN | 1955087 A | 5/2007 |
| CN | 201395359 Y | 2/2010 |
| CN | 102639411 A | 8/2012 |
| CN | 108082754 A | 5/2018 |
| CN | 207791668 U | 8/2018 |
| FR | 2732313 A1 | 10/1996 |
| GB | 406935 A | 3/1934 |
| GB | 2485333 A | 5/2012 |
| WO | 2010106367 A2 | 9/2010 |

OTHER PUBLICATIONS

European Patent Office, Communication pursuant to Article 94(3) EPC for Application 20 211 436.9-1014 dated Feb. 27, 2023.

Chinese National Intellectual Property Administration, First Notification of Office Action for Application 202011153386.1 dated Aug. 9, 2023.

* cited by examiner

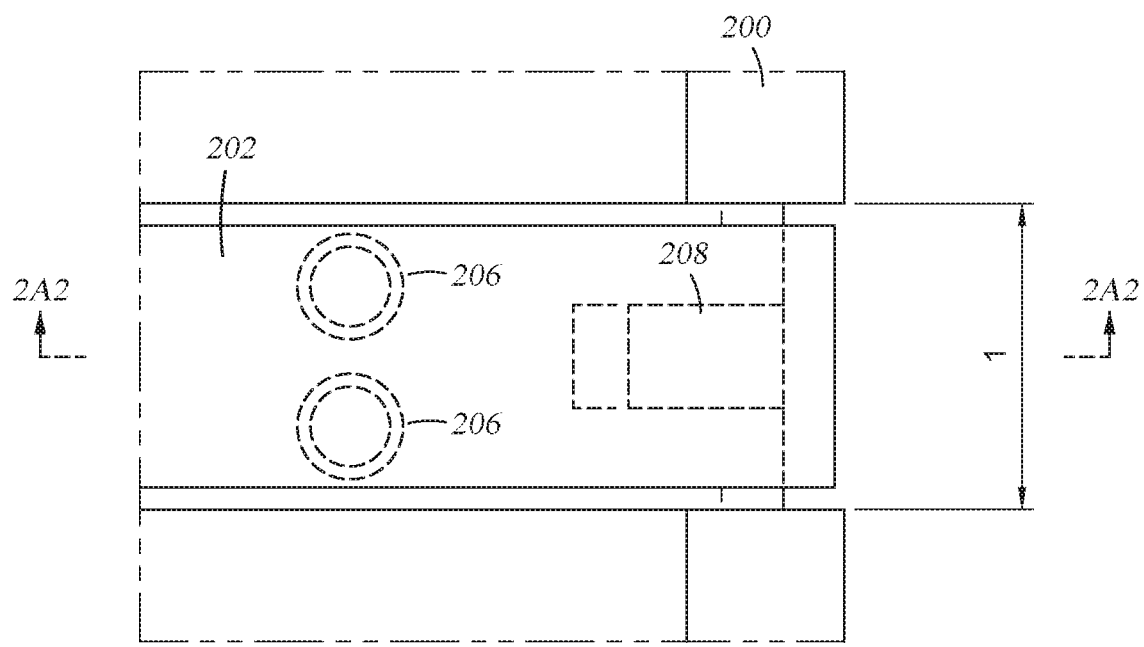
Fig. 2A1
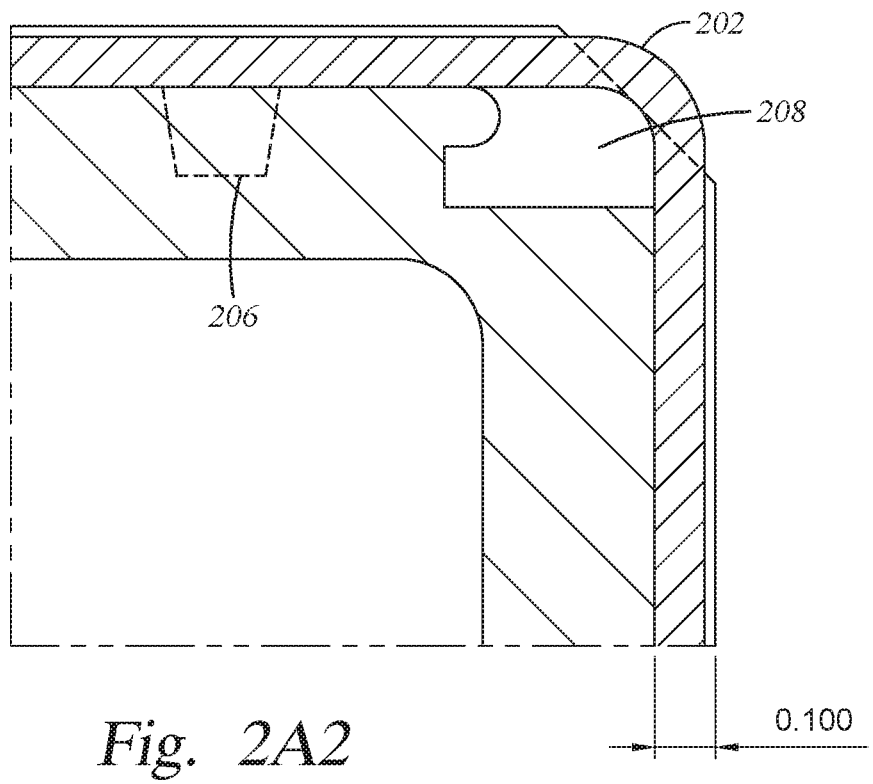
Fig. 2A2

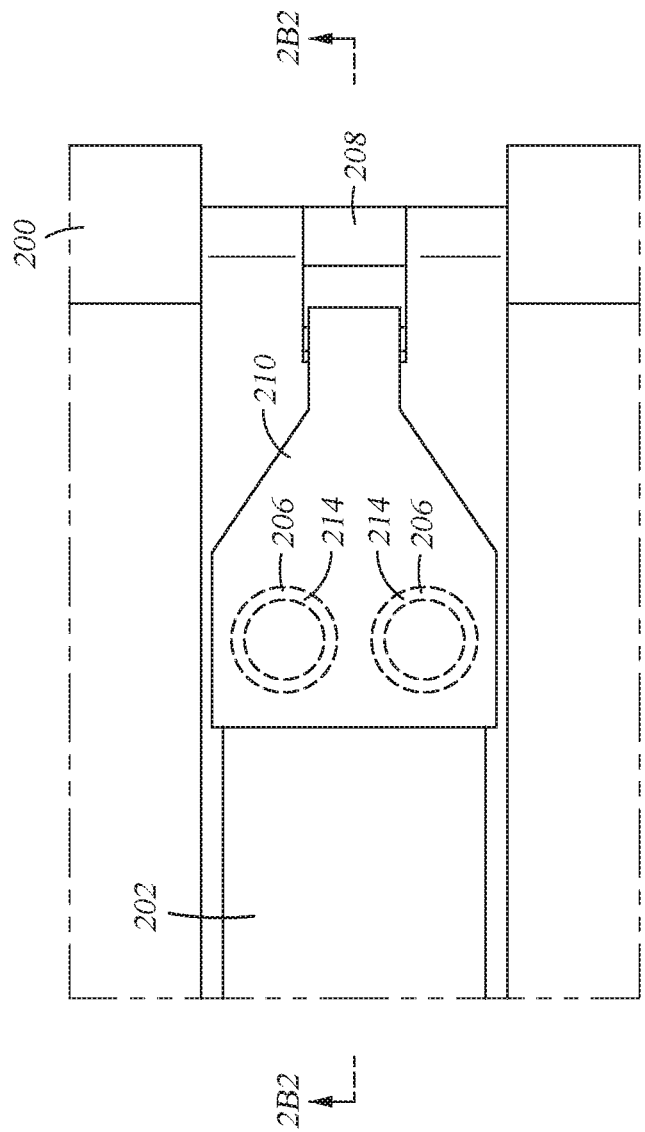
Fig. 2B1

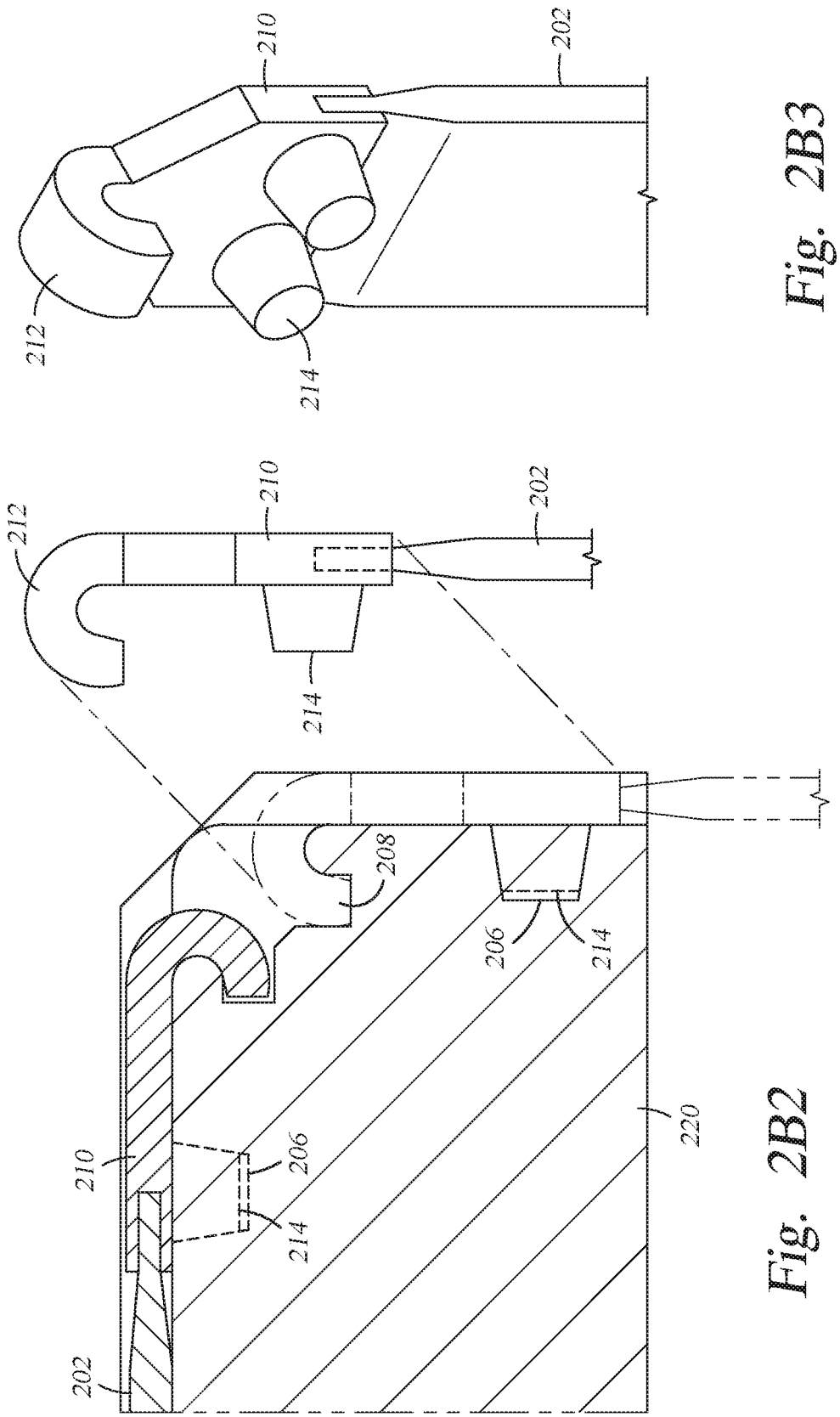

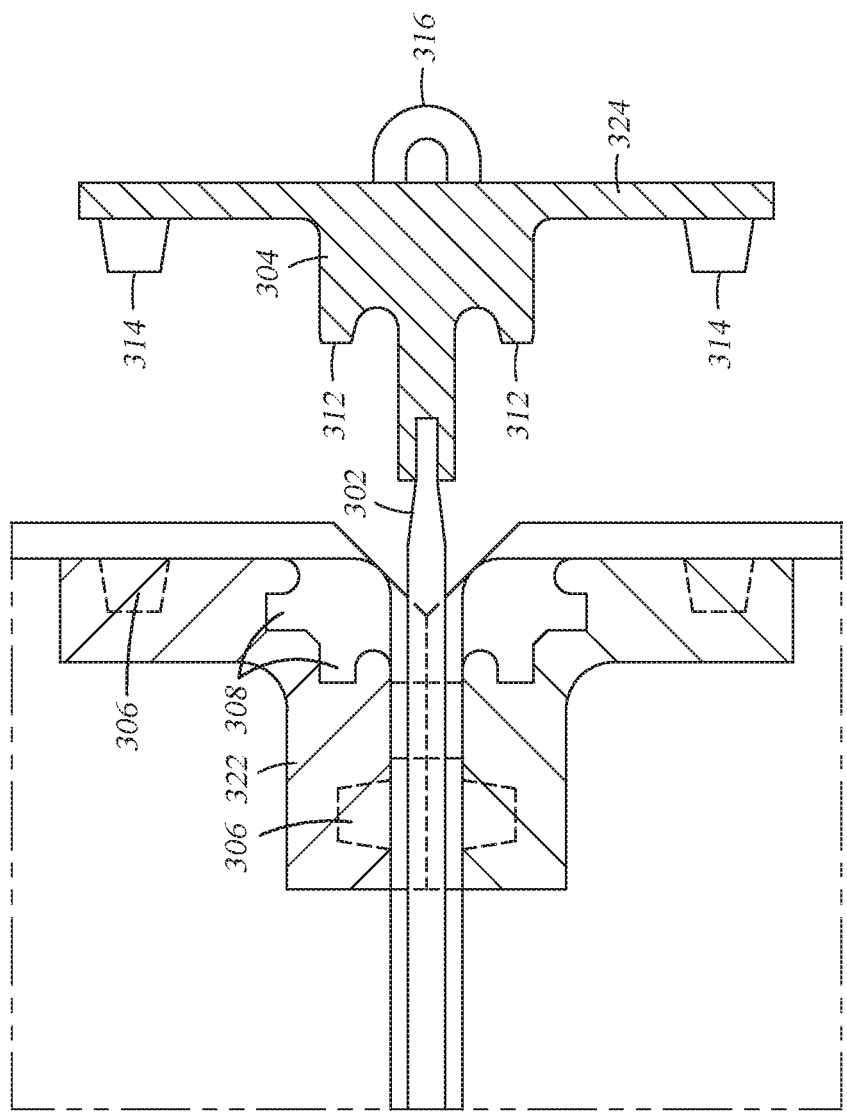
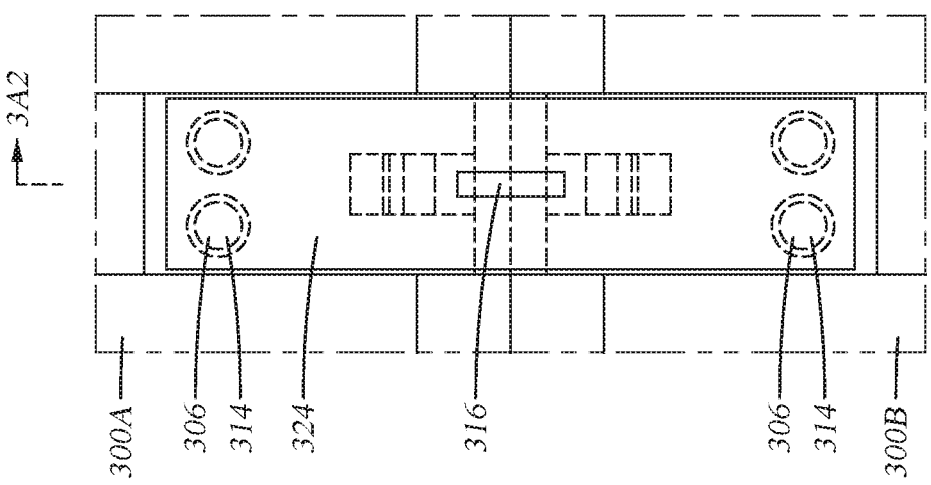
Fig. 3A2
Fig. 3A1

APPARATUSES FOR SECURING CONTAINERS

INTRODUCTION

Aspects of the present disclosure relate to apparatuses for securing containers, such as cargo containers used in intermodal shipping.

Cargo containers are moved about the world by various types of crafts, such as trucks, ships, trains, and aircraft. In order to facilitate shipment of goods in a global economy, standards for shipping containers have been developed to enable intermodal shipping. So-called "ISO" containers are containers with standardized outer dimensions as well as standardized connection point locations and hardware so that containers may reliably be carried from place to place by various types of crafts with complementary container connection equipment.

While standards have emerged for cargo containers, the connection equipment used for such cargo containers has generally gone without development. Further, conventional connection equipment may only be configured for use with certain types of containers or fittings, and not usable for other types of containers, such as sub-ISO sized containers, and containers with surface connectors.

Accordingly, there is a need for improved apparatuses and methods for engaging and securing cargo containers.

BRIEF SUMMARY

Certain embodiments provide a method of securing containers, comprising: connecting a first strap end connector of a tension strap to a first strap connector fitting on a first container, wherein: the first strap end connector comprises a first hook portion configured to engage a first recess in the first strap connector fitting, and the first strap end connector comprises a first protrusion configured to engage a second recess in the first strap connector fitting; connecting a second strap end connector of the tension strap to a second strap connector fitting on a second container, wherein: the second strap end connector comprises a first hook portion configured to engage a first recess in the second strap connector fitting, and the first strap end connector comprises a first protrusion configured to engage a second recess in the second strap connector fitting; and tensioning the tension strap.

Further embodiments provide a method of securing containers, comprising: rotating a second portion of a connector bar relative to a first portion of the connector bar to increase an angle between the first portion of the connector bar and the second portion of the connector bar, wherein: the first portion of the connector bar comprises a first plurality of protrusions; the second portion of the connector bar comprises at least one protrusion; engaging the first plurality of protrusions in a corresponding first plurality of recesses on a first side of a container; rotating the second portion of the connector bar relative to the first portion of the connector bar to reduce the angle between the first portion of the connector bar and the second portion of the connector bar; engaging the at least one protrusion in a corresponding recess on a second side of the container; and tensioning a tension strap connected to the first portion of the connector bar.

Further embodiments provide a container connection strap, comprising: a tension strap; and a strap end connector connected to the tension strap and comprising: a first hook portion configured to engage a first recess in a first strap connector fitting; and a first protrusion configured to engage a second recess in the first strap connector fitting.

Further embodiments provide a container connection strap, comprising: a tension strap; and a connector bar connected to the tension strap and comprising: a plurality of protrusions; a first connector bar portion connected to a second connector bar portion by a hinge, wherein at least one of the plurality of protrusions is on the first connector bar portion and at least another one of the plurality of protrusions is on the second connector bar portion.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIGS. 2A1-2A2 depict an example of a tension strap wrapping around an edge of a modular container 200.

FIGS. 2B1-2B3 depict a strap end connector attached to the tension strap 202 and engaged with a strap connector fitting of the container.

FIGS. 3A1-3A2 and 3B depict an example of another strap end connector 304 configured to interface with strap end connector fittings of a container.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1A:
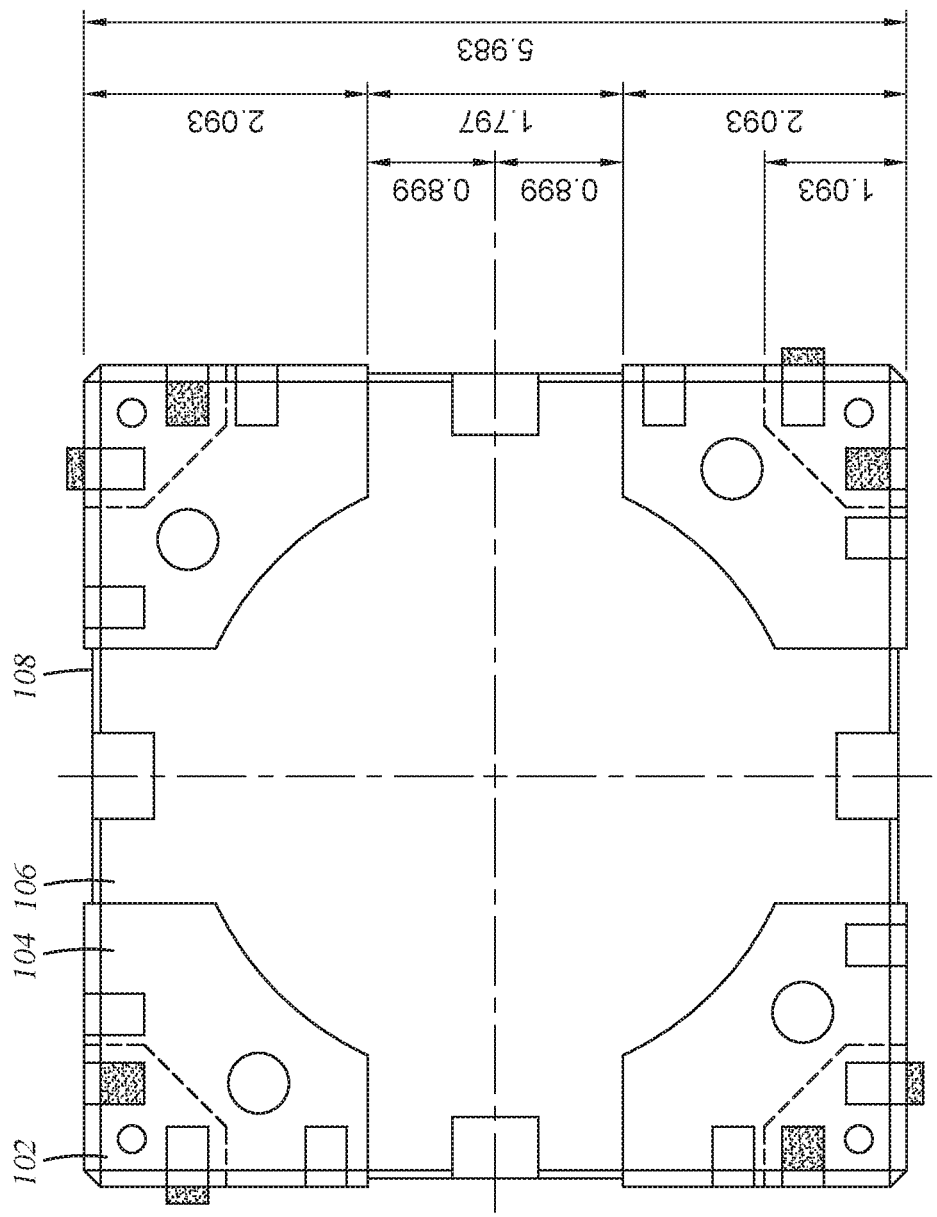
FIG. 1A depicts an example of a modular container with surface connector arrangements.

Aspects of the present disclosure provide apparatuses and methods for securing stacked containers, such as cargo containers that may be used in intermodal shipping.

While shipping containers have historically come in only a few standardized and generally very large sizes, the modern trend is to move towards smaller, more modular shipping containers. Modular shipping containers may have advanced features, such as corner fittings and/or surfaces with surface connector arrangements comprising protrusions and recesses in specific patterns, which allow the modular containers to connect to each other. In addition to allowing modular containers to be connected, surface connectors can beneficially distribute shear forces amongst the connected modular containers. Further, modular containers may have corner fittings that handle significant compression forces.

Described herein are methods and apparatuses for securing connected (e.g., adjacent and/or stacked) containers, including modular containers. Such methods and apparatuses beneficially provide tension between the connected containers so that they are fit for intermodal shipping.

Example Containers with Strap Recesses and Strap Connector Fittings

Containers described herein may utilize surface connector arrangements on container surfaces and/or on container corner fittings, which allow for direct interface between adjacent containers. Such containers may be referred to as modular containers.

Surface connector arrangements may generally include patterns of connector elements. Patterns of connector elements may comprise multiple types of interlocking connector elements. For example, a first type of connector element (e.g., a "male" connector element) may comprise a protrusion, projection, pad or the like configured to fit within a recess of a second type of connector element (e.g., a "female" connector element). Connector elements may be formed in many shapes.

Some arrangements of connector elements may be considered "passive" or "one-way" in that all of the connector elements are of a single type. For example, an arrangement for a face of a container may include all female type recesses. Such an arrangements may be intended to have other surface connectors attached to it.

Some arrangements of connector elements may be considered "two-way" in that its connector elements are of multiple types, such as a first type (e.g., protrusions) and a second type (e.g., recesses).

Some arrangements of connector elements may include fewer connector elements of the first type (protrusions) than of the second type (recesses). Other arrangements of connector elements could have more connector elements of the first type (protrusions) than the second type (recesses). However, in order to make sure that the arrangements can always interface correctly (e.g., where a protrusion has no matching recess with which to interface), the protrusions may be made spring-loaded.

Modular containers described herein further comprise strap recesses and strap connector fittings which allow for fitting straps to modular containers to hold them together without interfering with the surface connector arrangements.

For example, FIG. 1A depicts an example of a modular container 100 with surface connector arrangements on faces of the container (e.g., 104) and on corner fittings of the container (e.g., 102).

Modular container 100 also includes recessed areas (e.g., 106) for tension straps, which sit inside the level of the container face (closer to the centroid of the container volume). In this example, the strap recess (or channel) is in the range of 0.075 to 0.125 inches (i.e., inside the level of the container face), but in other examples, the strap recess could be shallower or deeper depending on the wall construction of the container.

FIG. 1A depicts one example in which the strap recess includes a circular recessed portion in the middle of the modular container face and generally rectangular recessed portions extending to each edge (e.g., 108) of container 100, but note that other strap recess patterns are possible. For example, the circular recessed portion in the middle could be omitted, leaving just a cross-shape of rectangular strap recesses.

While only a single face of modular container 100 is depicted in FIG. 1A, similar features, including surface connectors and strap recesses, may be present on one or more other sides of modular container 100. In some examples, each side of modular container 100 may be symmetric.

Further, FIG. 1A depicts one example size of a modular container, but similar features, including surface connectors and strap recesses, may be present on modular containers of different sizes.

Figure 1B:
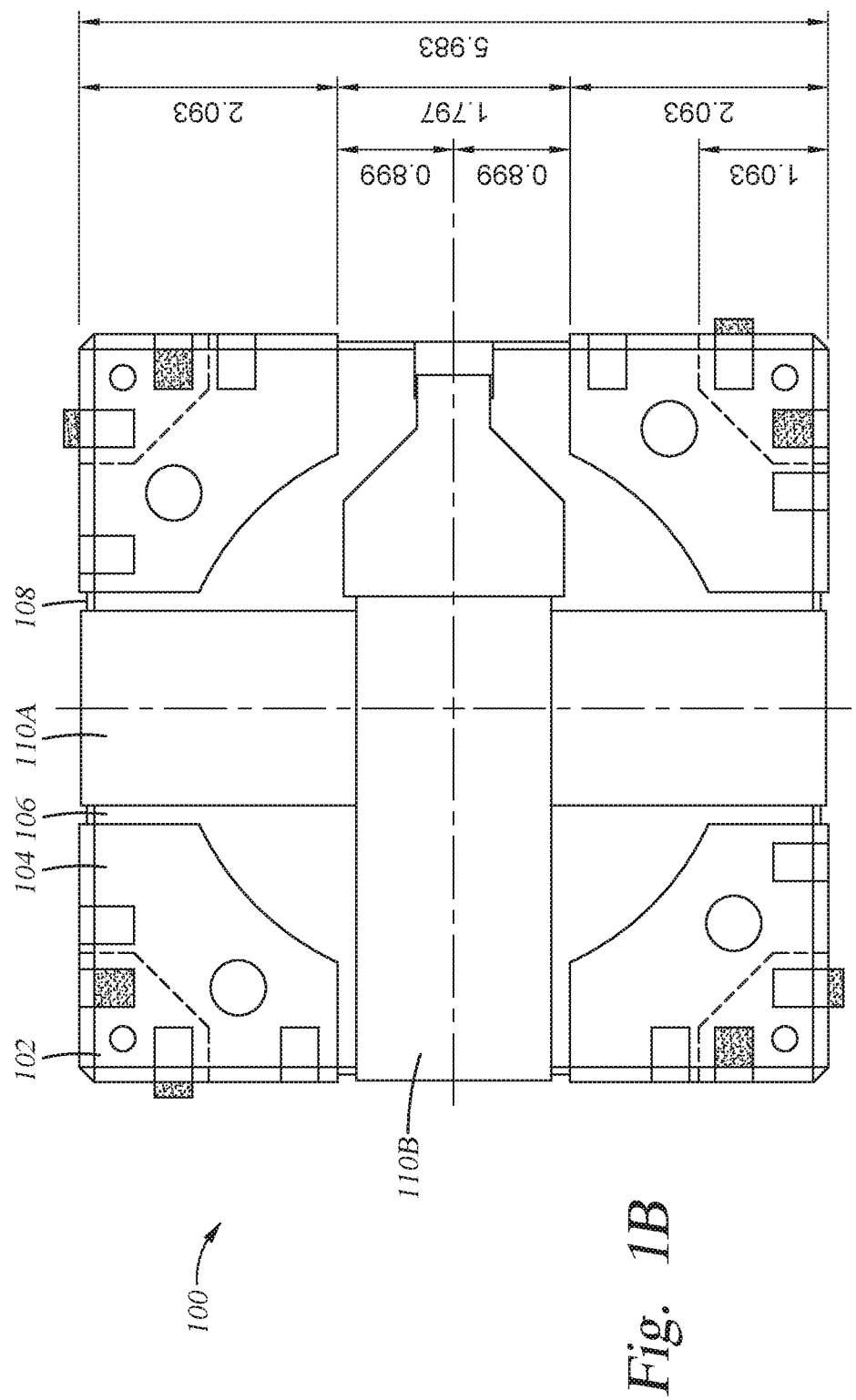
FIG. 1B depicts an example of a tension strap placed in a recess of the modular container of FIG. 1A.

As depicted in FIG. 1B, the recessed portions 106 allow for tension straps (e.g., 110A and 110B) to be securely connected to modular container 100. Because the tension straps 110A and 110B sit within the strap recesses, they are prevented from sliding off modular container 100 once under tension.

Further, because the strap recesses are deeper than the thickness of the tension straps 110A and 110B, the tension straps do not protrude from the face of modular container 100 and thus do not interfere with any of the other surface connector features on modular container 100.

Generally, the tension straps may be made of any sort of material suitable having a suitable load capacity. In some cases, further considerations for tension straps may include the amount of fiber stretch, UV resistance, water resistance, break strength, and abrasion resistance. For example, the tension straps in some embodiments may be made of polyester, nylon, or polypropylene, to name just a few examples.

Further, tension straps may generally be tensioned in various ways, such as via stretched during install (e.g., for tension straps having some elasticity), being tensioned by a mechanical device, such as a ratchet, or the like.

FIGS. 2A1-2A2 depicts an example of a tension strap 202 wrapping around an edge of a modular container 200 from above (FIG. 2A1) and in cross-section (FIG. 2A2). In this particular example, tension strap 202 is approximately 0.1 inches thick and approximately 1" wide, so that it fits within the strap recess without protruding, but in other examples, strap 202 may have different dimensions. Further, in this example, tension strap 202 sits within a recess, but lays over tension strap end connector recesses 206 and 208.

FIGS. 2B1-2B3 depict a strap end connector 210 attached to tension strap 202, which interfaces with strap connector recesses 206 and 208 of strap connector fitting 220 so that strap 202 may be secured to modular container 200 and maintain tension.

In this example, strap end connector 210 includes a hooked portion 212 configured to interface with strap end connector recess 208 and a protrusion 214 configured to interface with strap end connector recess 206. Notably, other arrangements of strap end connectors are possible.

In this example, strap connector fitting 220 is located along an edge of container 200. Notably, in the depicted embodiments, the tension straps and connector fittings are generally shown as centered, but in other embodiments they may be offset from a centerline of the container 200.

FIG. 2B3 depicts an example of the strap end connector 210 attached to tension strap 202 in an isometric view.

Though not shown in FIG. 2A1-2A2 or 2B1-2B3, tension strap 202 may include a ratcheting mechanism to place tension strap 202 under sufficient tension once the strap end connectors (e.g., 210) are engaged with the strap end connector fittings (e.g., 220).

FIGS. 3A1, 3A2, and 3B depict an example of another strap end connector 304 attached to the end of strap 302 and configured to interface with strap end connector fittings 322 on two different containers, which include connector recesses (e.g., 306 and 308), on two modular containers, 300A and 300B, at once. Strap end connector 304 may be referred to as a double-sided or dual strap end connector, whereas strap connector 210 in FIGS. 2B1 and 2B2 may be referred to as a single-sided or single strap end connector.

In particular, strap 302 fits within strap recesses between containers 300A and 300B and connects to strap end connector 304, which includes two integrated hook portions 312 and two protrusions 314 configured to interface with strap end connector fittings 322 on each of containers 300A and 300B, which include recesses for the hook portions and protrusions of strap end connector 304. Further, strap end connector 304 includes a vertical tension bar 324 that enables strap end connector 304 to prevent containers 300A and 300B from moving away from each other (e.g., prevent vertical relative movement of either container in the figure).

In this example, strap end connector 304 also includes a loop or eyelet portion 316, which may be used for further connecting strap end connector 304 or for manipulating connected modular containers 300A and 300B.

Figure 3B:
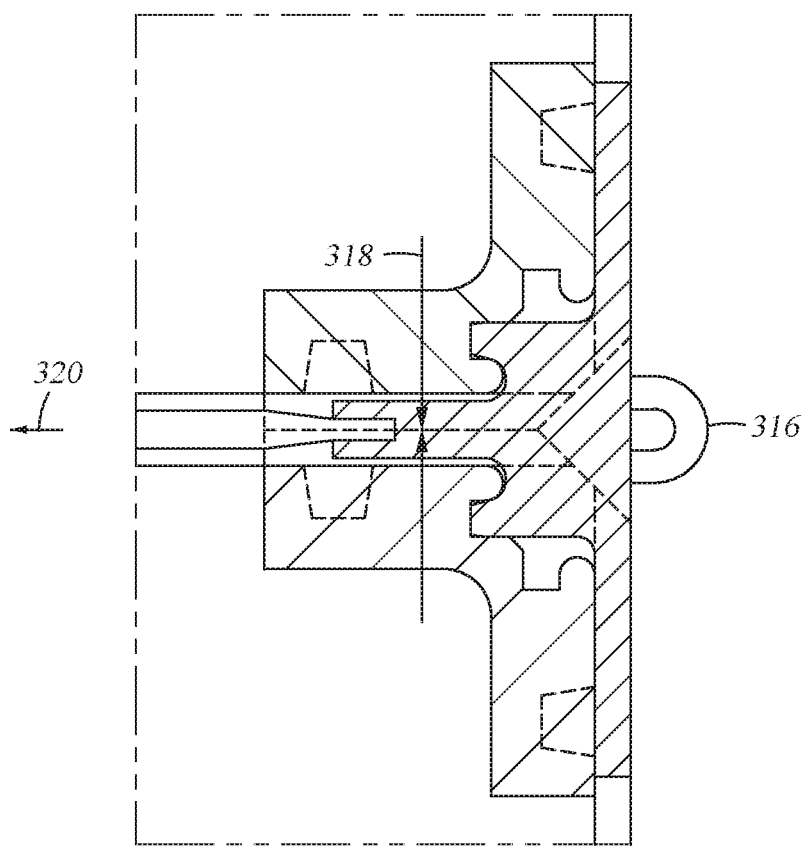

FIG. 3B depicts strap end connector 304 fully engaged with strap end connector fittings 322. In this example, strap end connector 304 not only provides for restraint between containers 300A and 300B along direction 318, but also tension along direction 320.

Though not depicted in FIG. 3B, strap 320 may pass between containers 300A and 300B and connect to an opposite side of containers 300A and 300B, or to another container altogether. In the latter case, tension strap 320 may pass through multiple strap recesses of multiple containers.

Though not shown in FIG. 3A1-3A2 or 3B, tension strap 302 may include a ratcheting mechanism to place tension strap 302 under sufficient tension once the strap end connectors (e.g., 304) are engaged with the strap end connector fittings (e.g., 322). In some cases, the ratcheting mechanism may be attached to an opposing side of tension strap 302, which may have a single-sided strap end connector (e.g., strap end connector 210 in FIGS. 2B1 and 2B2) in some embodiments.

Bar and Pin Strap Connectors for Modular Containers

Modular containers may sometimes include surface connector arrangements that do not easily allow for strap recesses and/or strap connector fittings. In such cases, recesses in the surface connector arrangements may be used for preventing strap movement (e.g., from slipping off a modular container) without a dedicated strap recess.

Figure 4A:
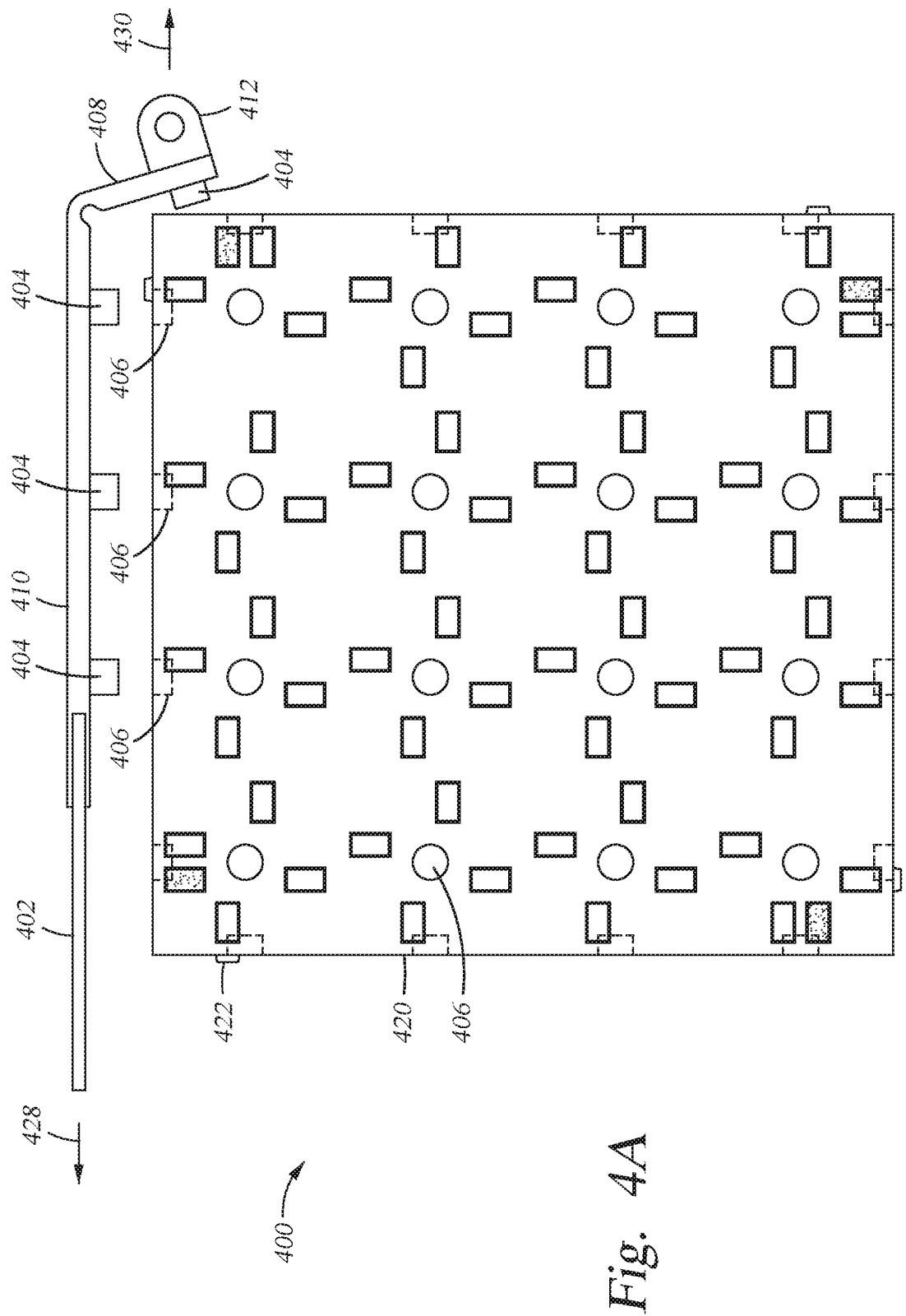
FIG. 4A-4C depicts examples of a tension strap with a connector bar having a plurality of protrusions attaching to a container.

For example, FIG. 4A depicts a tension strap 402 connected to a connector bar 410 having a plurality of protrusions (e.g., pins) 404. Each of the protrusions 404 from connector bar 410 are configured to fit within a recess 406 in a surface connector arrangement (e.g. 420).

Further, in this example, connector bar 410 includes a rotatable portion 408, which allows connector bar 410 to interface with two different sides of modular container 400. In one embodiment, rotatable portion 408 may rotate via a flexible material portion that allows for deformation of rotatable portion 408 relative to the fixed portion of connector bar 410 (the horizontal portion in FIGS. 4A-4C). In another embodiment, rotatable portion 408 may rotate via a hinge (e.g., a piano hinge), which in some embodiments may further include a rotational biasing spring. Such an embodiment may reduce any concern with fatigue to rotatable portion 408 over many uses.

In this example, forces 428 and 430 may be applied to tension strap 420 and rotatable portion 408 of connector bar 410 in opposite directions (e.g., opposing forces) to open up the angle of the rotatable portion 408 relative to the horizontal portion of connector 410 so that it may interface with container 400.

Connector bar 410 also includes an eyelet 412, which may be used for further connecting for further connections and for manipulating modular container 400 once strap 402 is under tension.

Notably, modular container 400 includes different surface connector arrangements (e.g., 420), some of which include protrusions (e.g., 422) and all of which include recesses (e.g., 424). The portions of modular container 400 including only recesses allows for strap 402 and bar 410 to interface with modular container 400 without interfering with protrusion-style surface connector elements.

Figure 4B:
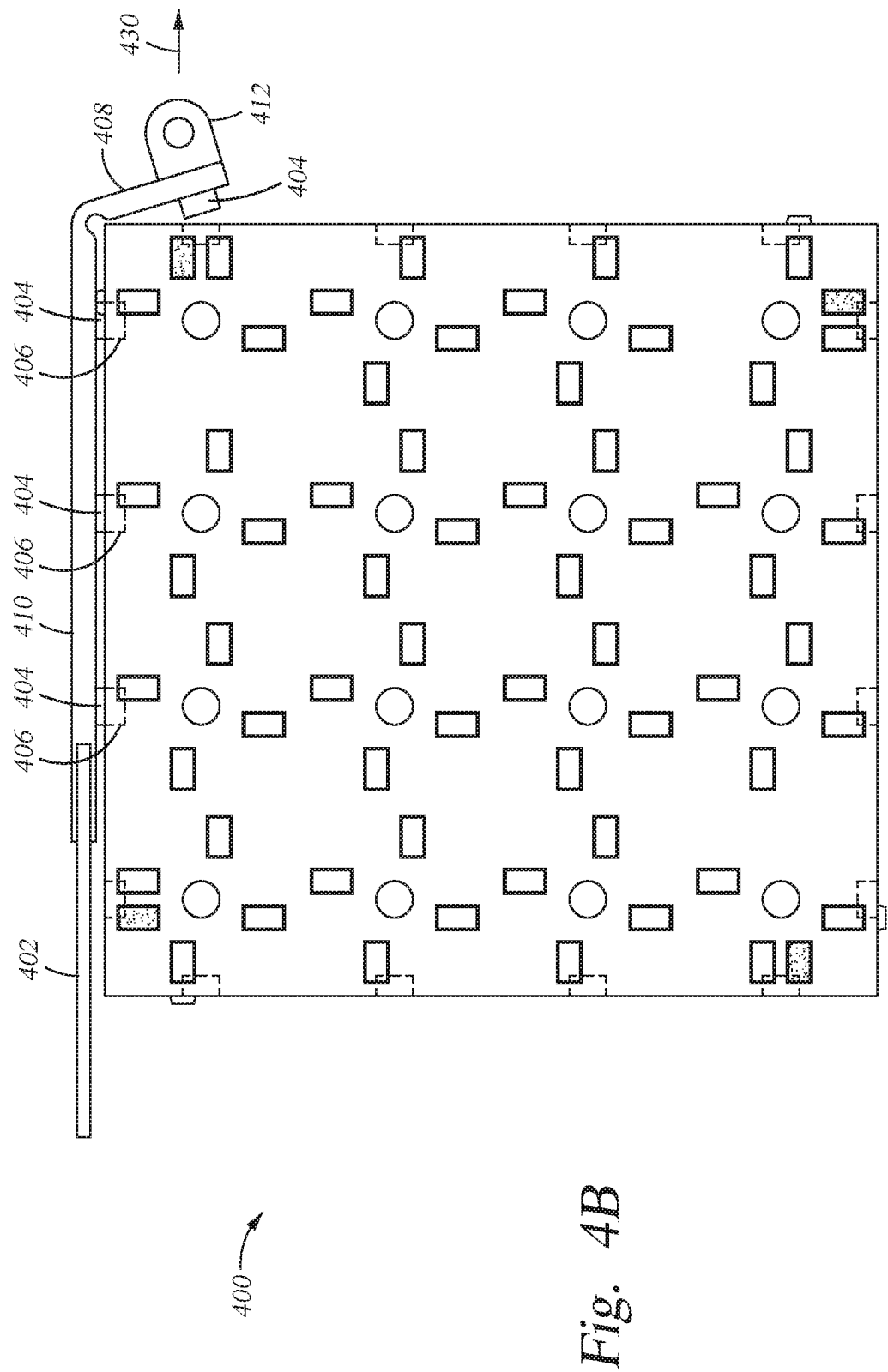

FIG. 4B depicts connector bar 410 interfaced with surface connector arrangements on modular container 400 via protrusions 404.

Here, force 430 may continue to be applied in order to maintain the open angle of the rotatable portion 408 of connector bar 410 while protrusions 404 are seated within recesses 406.

Figure 4C:
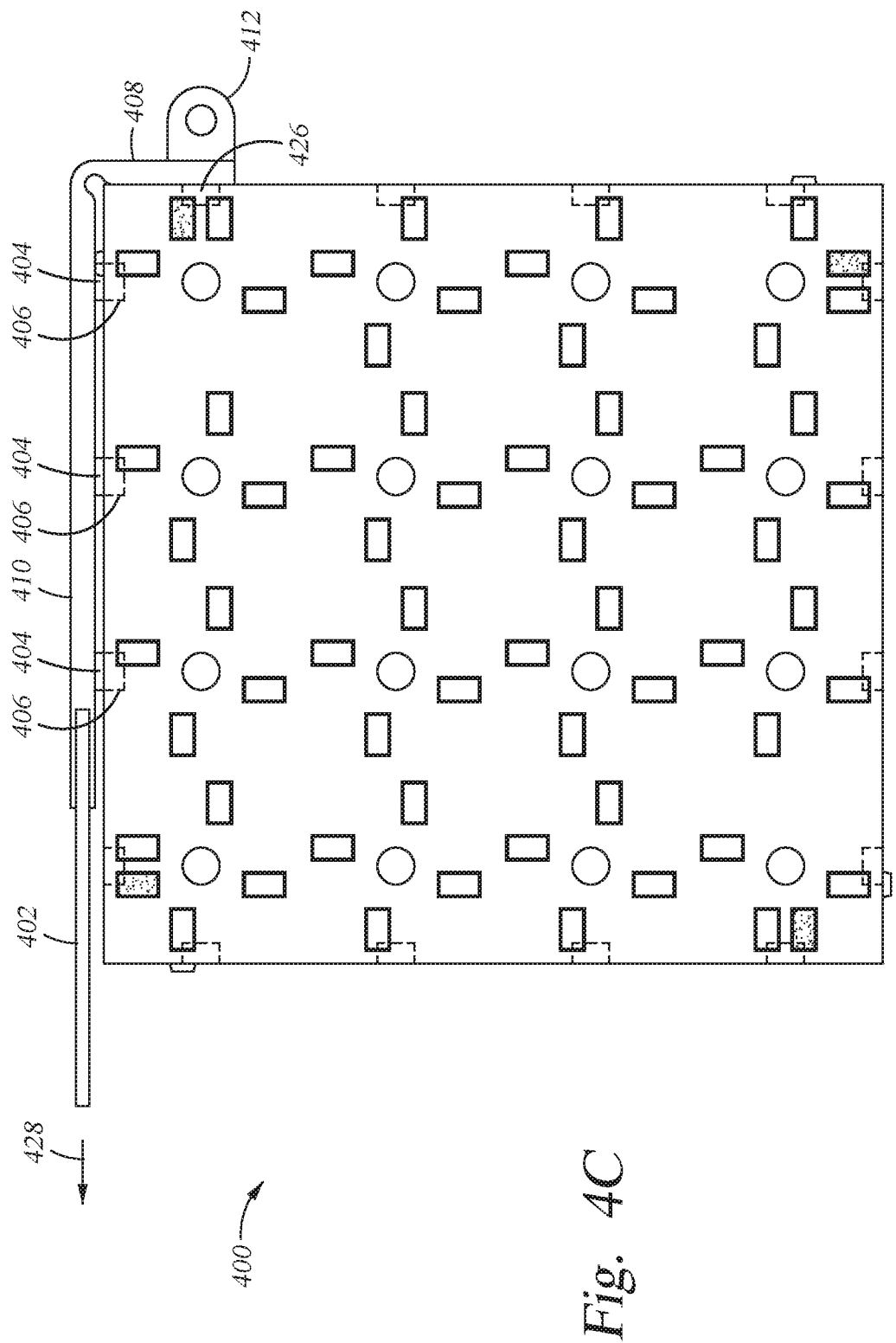

FIG. 4C also depicts connector bar 410 interfaced with surface connector arrangements on modular container 400 via protrusions 404. Additionally, force 430 has been removed so that rotatable portion 408 rotates back towards container 400 and protrusion 426 is interfaced with a recess in an adjacent side of modular container 400. Protrusion 426 beneficially prevents the protrusions along connector bar 410 (e.g., 404) from rotating away from the container face due to, for example, any eccentricity between the protrusion bearing centroid and the centroid of the strap section.

As depicted by the arrows, strap 402 is now able to be placed under tension (e.g., via force 428) in order to hold modular container 400.

Figure 5A:
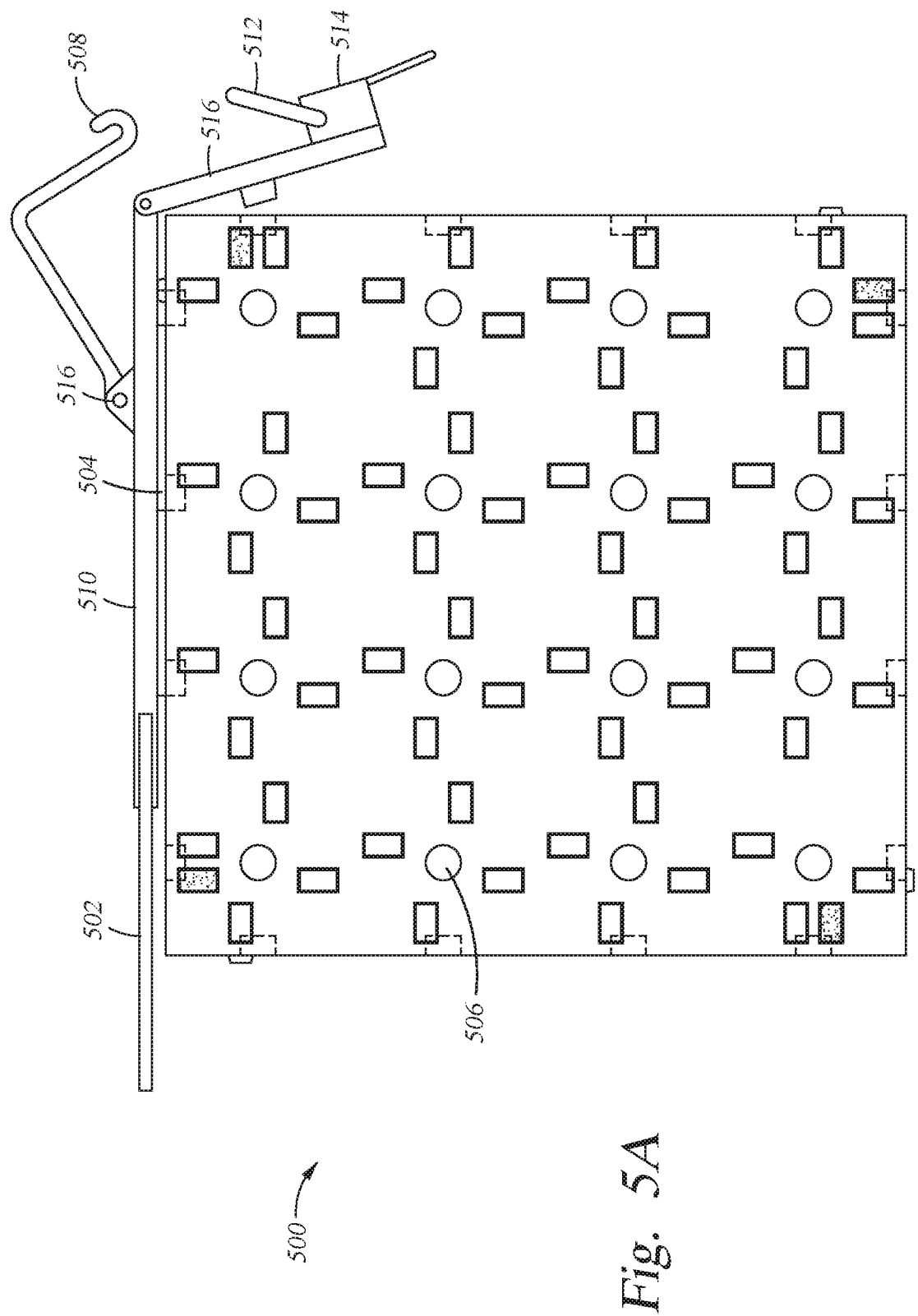
FIG. 5A depicts another example of a tension strap and connector bar configured to engage with recesses in a container.

FIG. 5A depicts another example of a tension strap 502 connected to a connector bar 510 having protrusions (e.g., 504) configured to engage with recesses (e.g., 506) in container 500.

In this embodiment, connector bar 510 uses a toggle latch to create locking tension in connector bar 510. Toggle latch includes a catch portion 508, which in this example is connected to connector bar 510 via a hinge 516. Toggle latch further includes a loop 512 configured to interface with catch portion 508 and a clamp 514. When loop 512 is engaged with catch portion 508 via clamp 514, which includes an integral biasing spring in this example, i.e., when the toggle latch is latched, the rotatable portion 518 is effectively locked into place so that the second side of container 500 is reliably engaged by connector bar 510, as depicted in FIG. 5B.

Figure 5B:
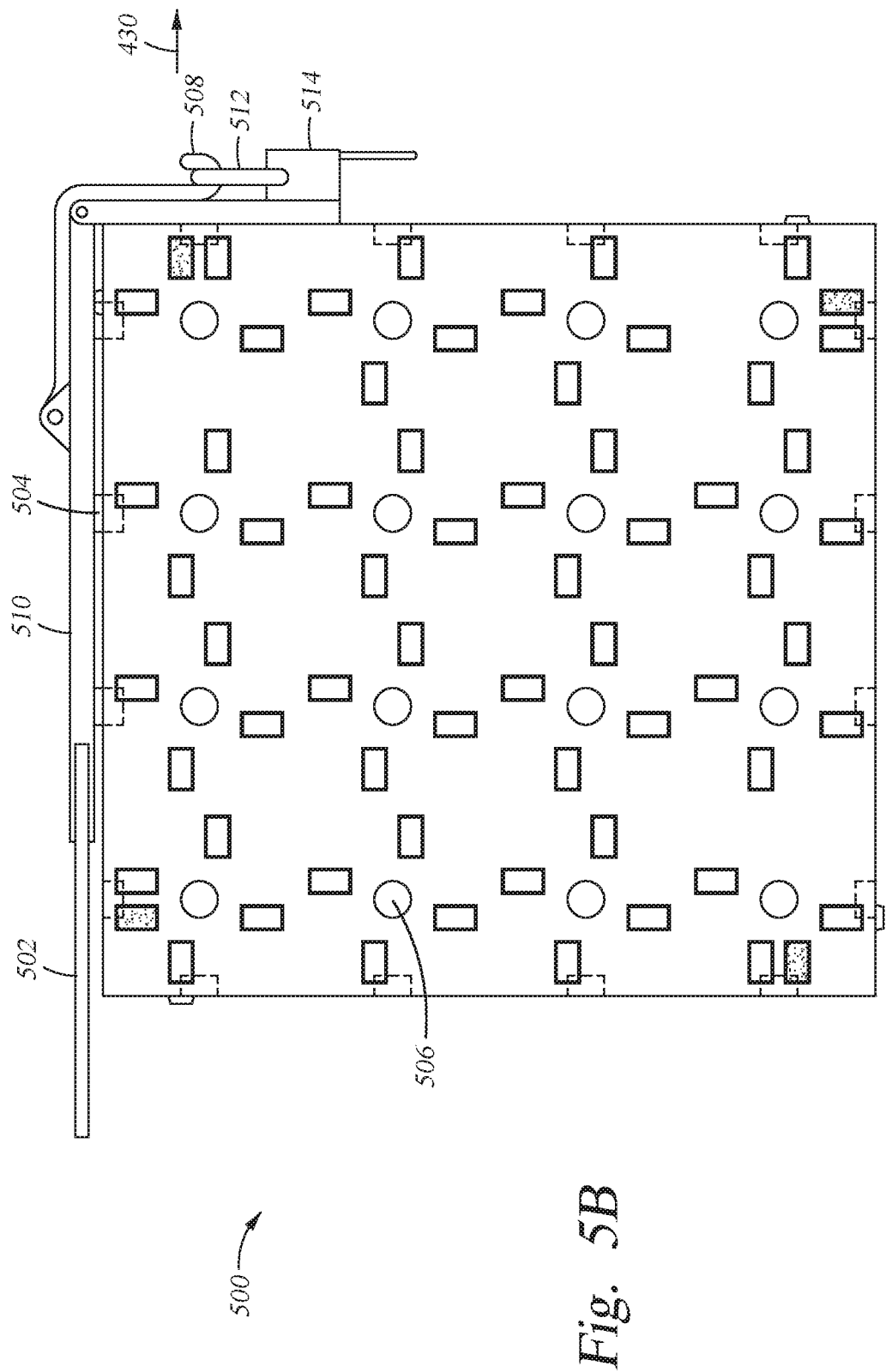
FIG. 5B depicts the tension strap placed under tension by a toggle latch.

FIG. 5B depicts tension strap 502 placed under tension by force 520 with the toggle latch in a latched state. As described above, force 520 may be applied, for example, by a ratcheting mechanism (not depicted).

Notably, in this example, unlike the example depicted with respect to FIGS. 4A-4C, no opposing forces need to be applied to tension strap 502 and rotatable portion 518 in order to install connector bar 510 to container 500. Rather, connector bar 510 can be installed and then tensioned after clamp 514 is engaged to lock rotatable portion 518 into place.

Example Method for Connecting Containers

Figure 6:
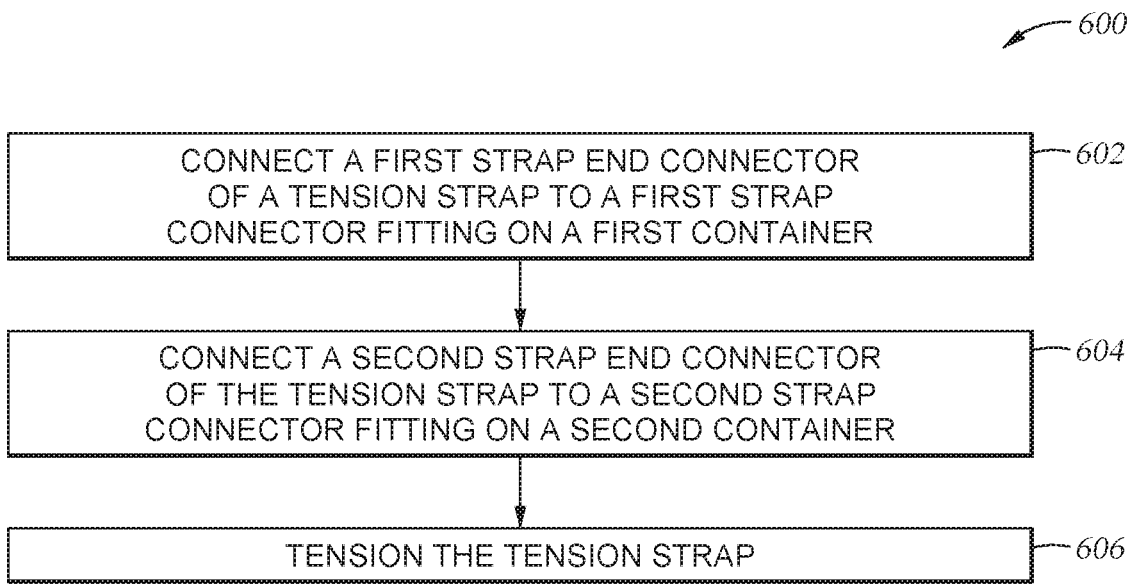
FIG. 6 depicts an example method 600 for connecting containers.

FIG. 6 depicts an example method 600 for connecting containers.

Method 600 begins at step 602 with connecting a first strap end connector of a tension strap to a first strap connector fitting on a first container, such as depicted in FIGS. 2B1-2B2 and 3B. In some embodiments, the first strap end connector comprises a first hook portion configured to engage a first recess in the first strap connector fitting, and the first strap end connector comprises a first protrusion configured to engage a second recess in the first strap connector fitting.

Method 600 then proceeds to step 604 with connecting a second strap end connector of the tension strap to a second strap connector fitting on a second container. In some embodiments, the second strap end connector comprises a first hook portion configured to engage a first recess in the second strap connector fitting, and the first strap end connector comprises a first protrusion configured to engage a second recess in the second strap connector fitting.

Method 600 then proceeds to step 606 with tensioning the tension strap. In some embodiments tensioning the tension strap comprises applying tension via a ratchet connected to the tension strap.

Some embodiments of method 600 further include placing the tension strap within a recess of at least one of the first container or the second container, such as depicted in FIG. 1B.

Some embodiments of method 600 further include connecting the first strap end connector to a third strap connector fitting of a third container, wherein: the first strap end connector further comprises a second hook portion configured to engage a first recess in the third strap connector fitting, and the first strap end connector further comprises a second protrusion configured to engage a second recess in the third strap connector fitting.

Some embodiments of method 600 further include placing the tension strap between the first container and the third container, such as depicted in FIGS. 3A2 and 3B.

Some embodiments of method 600 further include wrapping the tension strap around a corner of at least one of the first container or a second container, such as depicted in FIG. 1A.

In some embodiments, the first container comprises a plurality of surface connector arrangements, such as depicted in FIGS. 1A and 1B. In some embodiments, each surface connector arrangement of the plurality of surface connector arrangements comprises one or more of: a protrusion configured to fit within a recess of another surface connector arrangement, and a recess configured to fit within a protrusion of another surface connector arrangement.

In some embodiments, the first container comprises a plurality of corner fittings, such as depicted in FIGS. 1A and 1B. In some embodiments, each corner fitting of the plurality of corner fittings comprises one or more of: a protrusion configured to fit within a recess of another surface connector arrangement, and a recess configured to fit within a protrusion of another surface connector arrangement.

Figure 7:
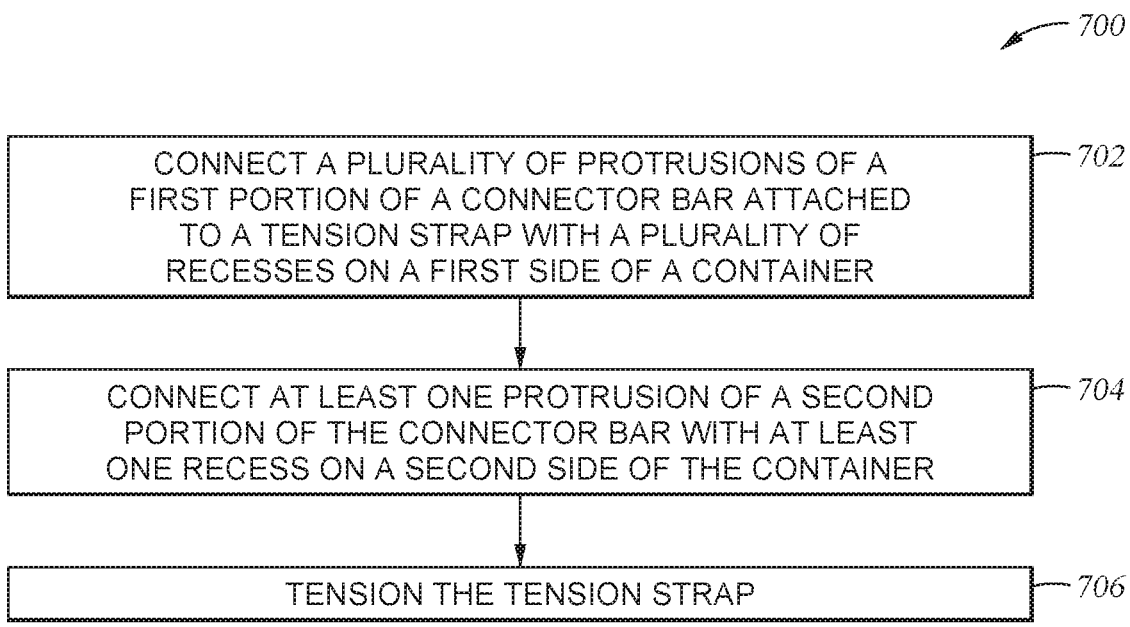
FIG. 7 depicts another example method 700 for connecting containers.

FIG. 7 depicts another method 700 for connecting containers.

Method 700 begins at step 702 with connecting a plurality of protrusions of a first portion of a connector bar attached to a tension strap with a plurality of recesses on a first side of a container, such as depicted in FIGS. 4B and 5A.

Method 700 then proceeds to step 704 with connecting at least one protrusion of a second portion of the connector bar with at least one recess on a second side of the container, such as depicted in FIGS. 4C and 5B. In some embodiments, connecting the at least one protrusion comprises rotating the second portion of the connector bar relative to the first portion of the connector bar to reduce or close the angle between the first portion of the connector bar and the second portion of the connector bar.

Method 700 then proceeds to step 706 with tensioning the tension strap.

In some embodiments, method 700 further includes rotating the second portion of the connector bar relative to the first portion of the connector bar to open (or increase) an angle between the first portion of the connector bar and the second portion of the connector bar, such as depicted in FIG. 4A.

As described above, tension may be applied to the tension strap in a variety of ways. In a first example, the strap is relatively inextensible, and the angle between the first and second portions of the connector bar (e.g., a horizontal portion and a rotatable portion) is flexible. The first and second portions may be forced apart (e.g., as described above with respect to FIGS. 4A-4C) to allow at least one protrusion to interface with the at least one recess in the second side of the container such that it can then snap into place.

In a second example, the tension strap is relatively inextensible, and the connector bar is rigid with two portions at an angle with respect to each other, such as ninety degrees. With this arrangement, the plurality of protrusions of the first portion of the connector bar are engaged with the plurality of recesses on the first side of the container, and the at least one protrusion on the second portion of the connector bar is engaged with the at least one recess in the second side of the container. Then, tension is applied to the tension strap, such as by ratcheting.

In some embodiments, method 700 further includes fastening a toggle latch to apply tension to the connector bar, such as depicted in FIG. 5B.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, "approximately" with respect to a dimension means plus or minus standard manufacturing tolerances.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions.

What is claimed is:

1. A method of securing containers, comprising:
    connecting a first strap end connector of a tension strap to a first strap connector fitting on a first container, wherein:
        the first strap end connector comprises a first hook portion configured to engage a first recess in the first strap connector fitting, and
        the first strap end connector comprises a first protrusion configured to engage a second recess in the first strap connector fitting;
    connecting a second strap end connector of the tension strap to a second strap connector fitting on a second container, wherein:
        the second strap end connector comprises a first hook portion configured to engage a first recess in the second strap connector fitting, and
        the second strap end connector comprises a first protrusion configured to engage a second recess in the second strap connector fitting; and
    tensioning the tension strap.

2. The method of claim 1, further comprising: placing the tension strap within a recess of at least one of the first container or the second container.

3. The method of claim 1, further comprising:
    connecting the first strap end connector to a third strap connector fitting of a third container, wherein:
        the first strap end connector further comprises a second hook portion configured to engage a first recess in the third strap connector fitting, and
        the first strap end connector further comprises a second protrusion configured to engage a second recess in the third strap connector fitting.

4. The method of claim 3, further comprising:
    placing the tension strap between the first container and the third container.

5. The method of claim 1, further comprising:
    wrapping the tension strap around an edge of at least one of the first container or the second container.

6. The method of claim 1, wherein:
    the first container comprises a plurality of surface connector arrangements,
    each surface connector arrangement of the plurality of surface connector arrangements comprises one or more of:
        a protrusion configured to fit within a recess of another surface connector arrangement, and
        a recess configured to fit within a protrusion of another surface connector arrangement.

7. The method of claim 6, wherein:
    the first container comprises a plurality of corner fittings, each corner fitting of the plurality of corner fittings comprises one or more of:
        a protrusion configured to fit within a recess of another surface connector arrangement, and
        a recess configured to fit within a protrusion of another surface connector arrangement.

8. The method of claim 1, wherein tensioning the tension strap comprises applying tension via a ratchet connected to the tension strap.

9. A container connection strap, comprising:
    a tension strap, wherein the tension strap sits inside a strap recess on a container; and
    a strap end connector connected to the tension strap and comprising:
        a first hook portion configured to engage a first recess in a first strap connector fitting, wherein the first hook portion is connected to the tension strap; and
        a first protrusion configured to engage a second recess in the first strap connector fitting, wherein the first protrusion is connected to the tension strap.

10. The container connection strap of claim 9, wherein the strap end connector further comprises:
    a second hook portion configured to engage a first recess in a second strap connector fitting; and
    a first protrusion configured to engage a second recess in the second strap connector fitting.

11. The container connection strap of claim 10, wherein the strap end connector further comprises: an eyelet.

* * * * *